Oct. 29, 1957    J. P. THEISEN    2,811,097
BEVERAGE MAKER
Filed Dec. 27, 1954
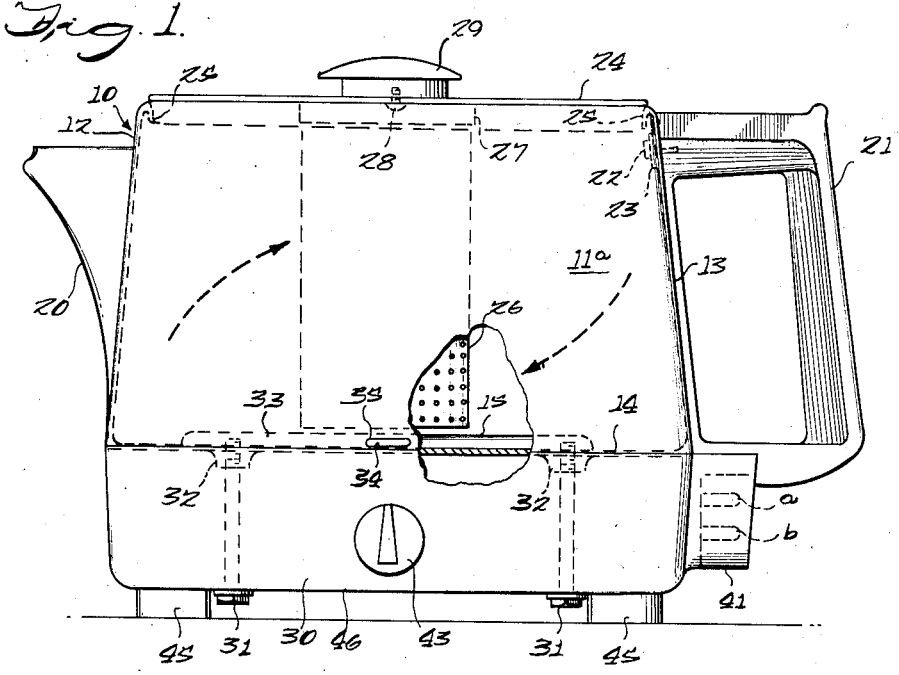
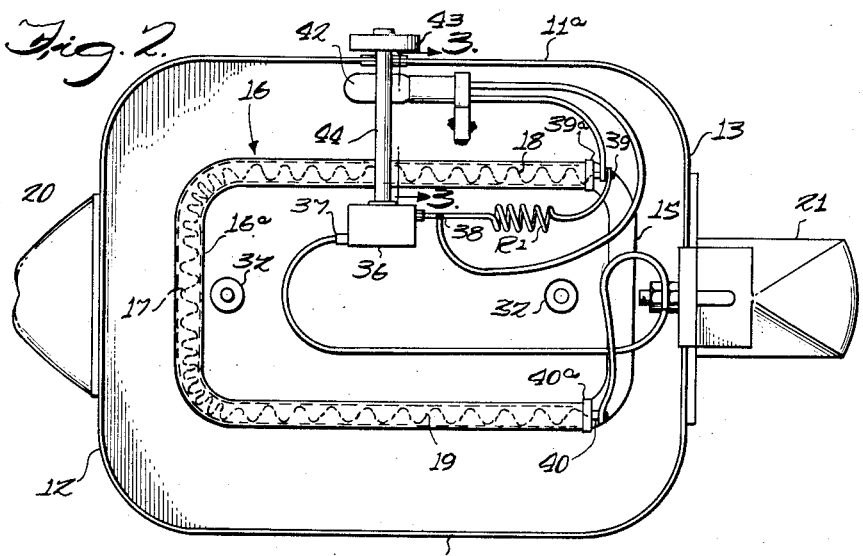
Inventor
John P. Theisen
By Louis Bernat
Attorney

United States Patent Office 2,811,097
Patented Oct. 29, 1957

2,811,097

BEVERAGE MAKER

John P. Theisen, Jacksonville, Ill., assignor, by mesne assignments, to Knapp-Monarch Company, St. Louis, Mo., a corporation of Delaware Application December 27, 1954, Serial No. 477,645

5 Claims. (Cl. 99—281)

This invention relates to beverage makers and particularly to such apparatus wherein the beverage is maintained at a constant temperature during and after its preparation.

In the past, beverage makers have been constructed wherein a thermostat controlled the current supplied to an element heating the beverage, so as to maintain some point or points in the beverage at a fixed temperature. A problem which has never been completely solved is that of determining, on the basis of the thermostat setting, the temperature of the beverage which is removed from the beverage maker at a particular location. This problem is directly related to the fact that not all points of the beverage in the beverage maker are maintained at a temperature which is directly related to the location from which the beverage is withdrawn.

The beverage maker of this invention overcomes this problem and improves this class of beverage makers through the relative location of sections of the heating element with respect to: (1) the over-all beverage maker; (2) the location in the beverage maker from which fluid is withdrawn; and (3) the container in the beverage maker which contains the flavor creating substance.

It is accordingly an object of this invention to provide a new and improved beverage maker.

Another object of this invention is to provide a beverage maker in which the portion of the beverage near the location from which it is withdrawn is exposed to a proportionately larger section of the heating element than the fluid remote from that location.

A further object of this invention is to secure the heating element in a well-like projection in the fluid area of the beverage maker so as to obtain a high efficiency of heat transfer from the heating element to the fluid.

A still further object of this invention is to heat the beverage in such a manner so as to cause a large convectional current of the beverage through the flavor creating substance which is maintained in a container.

Other objects and advantages of the invention will be apparent during the course of the following description when read in connection with the accompanying drawings, wherein:

Figure 1 is a front elevational view of the automatic beverage maker;

Figure 2 is a bottom view, with the heat insulating housing removed, showing the heating element and associated circuitry.

Figure 3 is a sectional view taken at 3—3 of Figure 2 and showing details of the name disk arrangement.

Referring now more particularly to Figure 1 of the drawing, there is shown a beverage maker having a liquid housing 10 of substantially rectangular shape. The liquid housing 10 consists of two side wall sections 11, 11a; a front wall section 12; a rear wall sections 13; and a bottom 14. The bottom 14 of the liquid housing 10 has formed in it a well-like channel 15 which projects into the liquid housing 10 and runs in a continuous self-closing path parallel to the housing walls 11, 12 and 13.

Positioned in the channel 15 is the heater element 16 enclosed in a copper sheath 16a brazed to channel 15 and consisting of a middle or center section 17 and two end sections 18 and 19 as shown in Figure 2. The space between the heater element 16 and the copper sheath 16a is filled with an insulating substance such as zirconium oxide. The center section 17 and the end sections 18 and 19 of the heating element 16 form three sides of a rectangle with the open side positioned along liquid housing wall side 13, and the center section 17 of the heating element 16 positioned parallel to the liquid housing wall side 12.

A spout 20 projects from the wall side 12 and is used to pour the heated beverage out of the automatic beverage maker. A handle 21 of heat insulating material is fixed by means of two screws 22 and liquid sealing gaskets 23 to the wall side 13.

A cover 24 slides into position along edges 25 to close the top of liquid housing 10. A perforated container 26 is detachably connected to a retaining cup 27. Quick detaching of the perforated container 26 from the retaining cup 27 is provided by any of such well known means as mating threads, twist lock members, or the like. The retaining cup 27 is fixed to the cover 24 by a screw 28 which is threaded through the cover 24 into a knob 29. The knob 29 is made of a low heat conducting material, such as a phenolic resin.

The container 26 is filled with a flavor creating substance, such as tea, and is of circular shape in the preferred embodiment. The vertically projected horizontal cross-sectional area of the container 26 lies within the space enclosed by the channel 15. The center section 17 of the heating element 16, which may be made of resistance wire windings, produces more calories of heat per unit length than its adjacent end sections 18 and 19. This may be effected, in the case of wire windings, by a closer spacing of such windings in the center section 17 than in the end sections 18 and 19. This compensates for the cooling effect produced by the spout 20 and the cooler beverage which is circulated by convectional currents in a downward direction adjacent the handle 21 towards the center section 17 of the element 16. At the same time the upward convectional currents of the beverage from the area adjacent the center section 17 through the perforated container 26 causes the beverage to rapidly accept the flavor of the substance contained in the container 26.

A heat insulating housing 30 is mounted to the bottom 14 of the liquid housing 10 by two bolts 31 which engage appropriately threaded bosses 32. A skirt-like rim 33 extends the liquid housing walls 11, 11a, 12 and 13 below the bottom 14 to meet the heat insulating housing 30. A translucent name disk 34 covers an aperture 35 in the rim 33, as shown in Figure 3. An adjustable thermostat 36 is mounted to the underside of liquid housing bottom 14, as is well known in the art. The adjustable thermostat 36 has two terminals 37 and 38. The terminal 38 is connected through a resistor $R_1$ to a terminal 39. A terminal 39 is the end of the heating element to which the end section 18 of the heating element 16 connects through a ceramic insulator 39a. A terminal 40 is the end of the heating element to which the end section 19 of the heating element 16 connects through a ceramic insulator 40a. A two terminal power receptacle 41 has its terminal $a$ connected to the terminal 37 and its terminal $b$ connected to the terminal 40. A pilot light 42 is mounted adjacent to the translucent name disk 34 and illuminates this disk when power is applied to the power receptacle. The pilot light 42 is electrically connected to the terminals 38 and 39.

A beverage temperature control 43 is connected to the adjustable thermostat 36 through a shaft 44. The heat insulating housing 30 has four legs 45 which provide clearance between the bottom surface 46 of the electric housing 30 and the table surface or other surface on which the automatic beverage maker is placed.

In operation, power is applied to terminals a and b of the power receptacle 41. The element 16 is then heated by the current flowing through it, and the pilot light 42 is "on" giving an indication that power is actually applied to the heating element. The adjustable thermostat 36 is then set from the temperature control 43 to a calibrated value such as warm, medium or hot.

As previously noted, the center section 17 of the heating element 16 generates more calories of heat per unit length than the end sections 18 and 19. A strong convectional current, indicated by arrowheads in Figure 1, is set up by the heat conducted from center section 17 to the liquid contained in liquid housing 10. This conventional current circulates the liquid through the receptacle 26, giving it the flavor of the substance contained in receptacle 26.

When the beverage has the desired flavor, receptacle 26 is removed from cover 24, which cover 24 is then replaced and thereafter the beverage may be poured for drinking purposes whenever desired. Due to the arrangement of the heating element 16, which provides a large amount of heat near the spout 20, while at the same time creating a strong convectional circulating current, the temperature of the beverage coming out of spout 20 may be closely regulated at any desired setting selected on temperature selector 43.

While there has been shown and described an invention in connection with certain specific embodiments, it will, of course, be understood that it is not desired to be limited thereto, since it is apparent that the principles herein disclosed are susceptible to numerous other applications, and modifications may be made in the structural arrangement and in the instrumentalities employed without departing from the spirit and scope of the invention as set forth in the appended claims.

I claim as my invention:

1. An automatic beverage maker comprising a substantially rectangular liquid housing including a bottom and a wall, a heat insulating housing mounted to said bottom of said liquid housing, a cover positioned on said liquid housing, a well-like channel in said bottom of said liquid housing projecting into said liquid housing and running in a continuous, self-closing path parallel to said housing wall, a heating element having a center-section and two end sections positioned in a portion of said channel and producing a larger amount of heat per unit length of said heating element in said center-section than in said end sections, a spout in said liquid housing wall adjacent said center-section of said heating element, a handle connected to said liquid housing wall opposite said spout, a circular perforated container connected to said cover at its underside and extending into said liquid housing with its vertically projected maximum horizontal cross-sectional area being within the space enclosed by said channel, a two terminal power receptacle mounted below said handle, a lead connecting said one end section of said heating element to one of said terminals of said power receptacle, an adjustable thermostat having a first and a second terminal in said heat insulating housing mounted to said liquid housing bottom, a resistor connected between said other end section of said heating element and said first terminal of said thermostat, said second terminal of said thermostat being connected to the other of said terminals of said power receptacle, said liquid housing wall having a rim projecting below said bottom of said liquid housing, said rim having an aperture therein, said aperture being covered with a translucent name disk, and an electric light having its energizing leads connected across said resistor and positioned adjacent said name disk so as to illuminate it whenever power is applied to said power receptacle.

2. An automatic beverage maker comprising a liquid housing including a bottom and a wall, a heat insulating housing mounted to said bottom of said liquid housing, a cover positioned on said liquid housing, a well-like channel in said bottom of said liquid housing projecting into said liquid housing and running in a continuous, self-closing path parallel to said housing wall, a heating element having a center-section and two end sections positioned in a portion of said channel and producing a larger amount of heat per unit length of said heating element in said center-section than in said end sections, a spout in said liquid housing wall adjacent said center-section of said heating element, a handle connected to said liquid housing wall opposite said spout, a perforated container connected to said cover at its underside and extending into said liquid housing with its vertically projected maximum horizontal cross-sectional area being within the space enclosed by said channel, a two terminal power receptacle mounted below said handle, a lead connecting said one end section of said heating element to one of said terminals of said power receptacle, an adjustable thermostat having a first and a second terminal in said heat insulating housing mounted to said liquid housing bottom, a resistor connected between said other end section of said heating element and said first terminal of said thermostat, said second terminal of said thermostat being connected to the other of said terminals of said power receptacle, said liquid housing wall having a rim projecting below said bottom of said liquid housing, said rim having an aperture therein, said aperture being covered with a translucent name disk, and an electric light having its energizing leads connected across said resistor and positioned adjacent said name disk so as to illuminate it whenever power is applied to said power receptacle.

3. An automatic beverage maker comprising a liquid housing including a bottom and a wall, a heat insulating housing mounted to said bottom of said liquid housing, a cover positioned on said liquid housing, a well-like channel in said bottom of said liquid housing projecting into said liquid housing and running in a continuous, self-closing path parallel to said housing wall, a heating element having a center-section and two end sections positioned in a portion of said channel and producing a larger amount of heat per unit length of said heating element in said center-section than in said end sections, a spout in said liquid housing wall adjacent said center-section of said heating element, a handle connected to said liquid housing wall opposite said spout, a perforated container connected to said cover at its underside and extending into said liquid housing with its vertically projected maximum horizontal cross-sectional area being within the space enclosed by said channel, a two terminal power receptacle mounted to said handle, a lead connecting said one end section of said heating element to one of said terminals of said power receptacle, an adjustable thermostat in said heat insulating housing mounted to said liquid housing bottom and connected between said other end section of said heating element and the other of said terminals of said power receptacle, said liquid housing wall having a rim projecting below said bottom of said liquid housing, said rim having an aperture therein, said aperture being covered with a translucent name disk, and an electric light having its energizing leads connected across said resistor and positioned adjacent said name disk so as to illuminate it whenever power is applied to said power receptacle.

4. An automatic beverage maker comprising a liquid housing including a bottom and a wall, a heat insulating housing mounted to said bottom of said liquid housing, a cover positioned on said liquid housing, a well-like channel in said bottom of said liquid housing projecting into said liquid housing and running in a continuous, self-closing path parallel to said housing wall, a heating element having a center-section and two end sections positioned in a portion of said channel and producing a larger amount of heat per unit length of said heating element in said center-section than in said end sections, a spout in said liquid housing wall adjacent said center-section of said heating element, a handle connected to said liquid housing wall opposite said spout, a perforated container connected to said cover at its underside and extending into said liquid housing with its vertically projected maximum horizontal cross-sectional area being within the space enclosed by said channel, a two terminal power receptacle mounted below said handle, a lead connecting said one end section of said heating element to one of said terminals of said power receptacle, an adjustable thermostat in said heat insulating housing mounted to said liquid housing bottom and connected between said other end section of said heating element and the other of said terminals of said power receptacle.

5. An automatic beverage maker comprising a liquid housing including a bottom and a wall, a heat insulating housing mounted to said bottom of said liquid housing, a cover positioned on said liquid housing, a well-like channel in said bottom of said liquid housing projecting into said liquid housing and running in a continuous, self-closing path parallel to said housing wall, a heating element having a center-section and two end sections positioned in a portion of said channel and producing a larger amount of heat per unit length of said heating element in said center-section than in said end sections, a spout in said liquid housing wall adjacent said center-section of said heating element, a handle connected to said liquid housing wall opposite said spout, a perforated container connected to said cover at its underside and extending into said liquid housing with its vertically projected maximum horizontal cross-sectional area being within the space enclosed by said channel, a two terminal power receptacle, a lead connecting said one end section of said heating element to one of said terminals of said power receptacle, an adjustable thermostat in said heat insulating housing mounted to said liquid housing bottom and connected between said other end section of said heating element and the other of said terminals of said power receptacle.

References Cited in the file of this patent

UNITED STATES PATENTS

| | | |
|---|---|---|
| 2,093,980 | Linger | Sept. 21, 1937 |
| 2,107,924 | Adams | Feb. 8, 1938 |
| 2,526,566 | Kolisch | Oct. 17, 1950 |
| 2,560,214 | Cameron | July 10, 1951 |
| 2,597,695 | Braski et al. | May 20, 1952 |
| 2,690,709 | Farr et al. | Oct. 5, 1954 |
| 2,692,937 | Clark | Oct. 26, 1954 |

FOREIGN PATENTS

| | | |
|---|---|---|
| 145,045 | Australia | Feb. 8, 1952 |